US007054863B2

(12) United States Patent
Lasensky et al.

(10) Patent No.: US 7,054,863 B2
(45) Date of Patent: May 30, 2006

(54) SYSTEM AND METHOD FOR ORIGINATING, STORING, PROCESSING AND DELIVERING MESSAGE DATA

(75) Inventors: Peter Joel Lasensky, San Diego, CA (US); Mark Everett Fehrenbach, San Diego, CA (US); Richard Edward Rohmann, San Diego, CA (US)

(73) Assignee: Pacific Datavision, Inc., San Diego, CA (US)

( * ) Notice: Subject to any disclaimer, the term of this patent is extended or adjusted under 35 U.S.C. 154(b) by 560 days.

(21) Appl. No.: 10/174,655

(22) Filed: Jun. 19, 2002

(65) Prior Publication Data

US 2002/0161775 A1    Oct. 31, 2002

Related U.S. Application Data

(63) Continuation-in-part of application No. 09/859,245, filed on May 16, 2001, which is a continuation-in-part of application No. 09/713,487, filed on Nov. 15, 2000, now abandoned.

(51) Int. Cl.
*G06F 17/30* (2006.01)

(52) U.S. Cl. .............................................. 707/9; 707/10
(58) Field of Classification Search .......... 707/1–104.1
See application file for complete search history.

(56) References Cited

U.S. PATENT DOCUMENTS

| 5,003,576 | A |   | 3/1991 | Helferich |
|---|---|---|---|---|
| 5,105,197 | A |   | 4/1992 | Clagett |
| 5,179,627 | A |   | 1/1993 | Sweet et al. ................. 704/200 |
| 5,535,322 | A |   | 7/1996 | Hecht ............................. 705/1 |
| 5,630,205 | A |   | 5/1997 | Ekelund |
| 5,646,839 | A |   | 7/1997 | Katz |
| 5,659,742 | A |   | 8/1997 | Beattie et al. ............... 707/104 |
| 5,675,507 | A |   | 10/1997 | Bobo, II ....................... 709/206 |
| 5,684,862 | A | * | 11/1997 | Finnigan .................. 379/88.22 |
| 5,737,532 | A |   | 4/1998 | DeLair et al. .............. 709/219 |
| 5,745,551 | A | * | 4/1998 | Strauch et al. .............. 455/413 |
| 5,796,727 | A |   | 8/1998 | Harrison et al. |
| 5,825,854 | A |   | 10/1998 | Larson et al. ................. 379/64 |
| 5,835,575 | A |   | 11/1998 | Stoller et al. |
| 5,862,325 | A | * | 1/1999 | Reed et al. ................. 709/201 |
| 5,867,821 | A |   | 2/1999 | Ballantyne et al. ............ 705/2 |
| 5,963,912 | A |   | 10/1999 | Katz |
| 5,977,913 | A | * | 11/1999 | Christ ........................ 342/465 |

(Continued)

OTHER PUBLICATIONS

International Search Report and Transmittal Notification for related application PCT/US01/43793, dated Apr. 3, 2002.

(Continued)

*Primary Examiner*—Luke S Wassum
*Assistant Examiner*—Linh Black
(74) *Attorney, Agent, or Firm*—Baker & McKenzie LLP

(57) ABSTRACT

A system for originating, storing, processing and delivering data includes a transmission device, a server system, and a recipient connected by various networks. According to one method, the transmission device employing a simple transmit action transmits a message along with metadata to a receiver connected with the server system. Particular metadata are mapped to an address identifier associated with the receiver to determine a location for storing the message, as well as other parameters such as information relating to one or more intended recipients. An intended recipient is notified of an accessible message via e-mail, and can access a copy of the message via a web browser served a web page by the server system.

33 Claims, 13 Drawing Sheets

U.S. PATENT DOCUMENTS

| | | | | |
|---|---|---|---|---|
| 6,009,398 | A | 12/1999 | Mueller et al. | 704/275 |
| 6,021,410 | A | 2/2000 | Choy | 707/103 |
| 6,122,639 | A * | 9/2000 | Babu et al. | 707/103 R |
| 6,144,942 | A | 11/2000 | Ruckdashel | 705/9 |
| 6,167,395 | A * | 12/2000 | Beck et al. | 707/3 |
| 6,175,822 | B1 | 1/2001 | Jones | 704/270 |
| 6,226,618 | B1 * | 5/2001 | Downs et al. | 705/1 |
| 6,292,783 | B1 | 9/2001 | Rohler et al. | |
| 6,298,326 | B1 | 10/2001 | Feller | 704/270 |
| 6,321,078 | B1 | 11/2001 | Menelli et al. | |
| 6,345,288 | B1 * | 2/2002 | Reed et al. | 709/201 |
| 6,405,215 | B1 | 6/2002 | Yaung | 707/104 |
| 6,421,009 | B1 | 7/2002 | Suprunov | |
| 6,433,732 | B1 | 8/2002 | Dutta et al. | |
| 6,442,250 | B1 * | 8/2002 | Troen-Krasnow et al. | 379/93.15 |
| 6,442,604 | B1 | 8/2002 | Romine | 709/219 |
| 6,456,852 | B1 | 9/2002 | Bar et al. | |
| 6,539,404 | B1 * | 3/2003 | Ouchi | 715/500 |
| 6,564,071 | B1 | 5/2003 | Bergins et al. | |
| 6,591,242 | B1 | 7/2003 | Karp et al. | 705/2 |
| 6,721,542 | B1 * | 4/2004 | Anttila et al. | 455/68 |
| 6,782,414 | B1 * | 8/2004 | Xue et al. | 709/206 |
| 2002/0057203 | A1 | 5/2002 | Borders et al. | |
| 2002/0069063 | A1 * | 6/2002 | Buchner et al. | 704/270 |
| 2002/0109706 | A1 * | 8/2002 | Lincke et al. | 345/700 |
| 2003/0204568 | A1 | 10/2003 | Bhargava et al. | |
| 2005/0176451 | A1 | 8/2005 | Helferich | |
| 2005/0186945 | A1 | 8/2005 | Manzor | |

OTHER PUBLICATIONS

Database WPI Section EI, "Medical image database management system used in hospital-controls additional connection of diagnostic image database to network during generation of diagnostic report file by scanning medical image displayed in medical image work station", Derwent Publications Ltd., London, GB, AN1998-106801, XP002192976 & JP 09 330374 A (Hitachi Medical Corp) Abstract, (Dec. 22, 1997).

International Search Report for PCT/US04/29493 dated Sep. 29, 2005.

Sawhney and Schmandt, "Nomadic Radio: Speech and Audio Interaction for Contextual Messaging in Nomadic Environments" Speech Interface Group, MIT Media Laboratory, ACM Transactions on Computer-Human Interaction, vol. 7, No. 3, Sep. 2000, pp. 353-383.

* cited by examiner

SYSTEM AND METHOD FOR ORIGINATING, STORING, PROCESSING AND DELIVERING MESSAGE DATA

BACKGROUND OF THE INVENTION

This application is a continuation-in-part of U.S. patent application Ser. No. 09/859,245 filed May 16, 2001, entitled "SYSTEM AND METHOD FOR CREATING A DIGITAL PROJECT LOG," which is a continuation-in-part of U.S. patent application Ser. No. 09/713,487 filed Nov. 15, 2000, now abandoned entitled "SYSTEM AND METHOD FOR PROJECT LOG STORAGE AND RETRIEVAL."

This invention relates broadly to the field of communications, and more particularly to a communication system and method for originating, storing, and delivering data.

Communication systems are used in a wide variety of data storage and retrieval applications. Some of these applications include data log systems, wireless dictation, voice mail and messaging systems, and network storage applications. Communication systems employing networked communication devices have largely supplanted traditional hardcopy file systems and note-taking techniques. The shortcomings of these and other traditional techniques are well-known: they are tedious, difficult to organize and comprehend, easily misplaced, and hard to secure.

However, some conventional communication systems have their own limitations. One example is the use of a recording device to memorialize an observation or event. The recording device may be a tape recorder or a video recorder, where the recording preserves a monitoring person's observations on a recording medium such as a cassette tape, microcassette, or video cassette. The recording medium can be lost or otherwise inaccessible. If it is accessible, it is usually accessible to only one user or otherwise limited to a small number of persons who must each maintain a copy. The copies are also difficult to reproduce and distribute effectively. Further, recordings are difficult to compile in a way that the recording media can be arranged in some logical, easily retrievable order.

Additional problems exist with conventional data storage or recording mechanisms for keeping records. One additional problem relates to control of the data. A voice mail system, for example, stores messages from a sender, but the sender relinquishes complete control of the messages to either a recipient or a third party over whom the sender has no control. Without adequate controls, data integrity and security can be lost.

Another additional problem is complexity. Again, using voice mail as an example, the sender must first dial a long telephone number, and then usually has to navigate to a storage location by keying in many more numbers or access codes. Each keystroke requires time and concentration, and as such diminishes the likelihood of successfully reaching a destination.

One further problem with conventional communication systems is the ease with which data can be delivered once it has been received and stored. There are many techniques and platforms for communicating data, however conventional techniques and platforms lack end-to-end security while still allowing automated delivery. Further, most systems are non-scalable, and cannot support a large number of users and/or recipients.

What is needed is a system and method of originating, processing and storing message data that is secure and easy to use, yet which leverages existing network architectures for efficient and effective delivery of message data to intended recipients.

SUMMARY OF THE INVENTION

This invention relates to a communication system and method. Specifically, this invention provides a system and method for originating, storing, processing and delivering messages using a scalable architecture and employing any combination of various communication networks.

According to one embodiment, a method includes establishing a connection from a transmission device to a receive device, and transmitting data along with a transmission device identifier over the connection to a file storage connected with the receive device. The method further includes mapping the transmission device identifier to a database record based on an identifier of the receive device, wherein the database record is associated with the data stored in the file storage. The method further includes appending reference indicia to the database record.

According to another embodiment, a method of originating and delivering a message includes selecting an address identifier associated with at least one intended recipient, and in response to a single transmit action, transmitting a message intended for the intended recipient along with a sender identifier of a transmission device to an address of a server system associated with the address identifier.

The address identifier can represent a receiver device connected to the server system. The sender identifier can represent a sender or the transmission device operated by the sender.

According to another embodiment, a system for originating, storing, processing and delivering messages includes a transmission device, a server system connected to the transmission device by a first network path, and a recipient platform connected to the server system by a second network path.

DETAILED DESCRIPTION OF THE PREFERRED EMBODIMENTS

This invention provides a communication system and method for originating, processing storing and delivering data. In one embodiment, a user selects a recipient, presses a button, and speaks into the transmission device. When the user is done speaking, he releases the button. With no further action on the part of the sender, the message is transmitted to a server system. The server system stores the message as a digital file, determines the destination address of the intended recipient by reference to information previously stored in the server system, and sends the recipient a notification that enables the recipient to instantly retrieve a copy of the message. In another embodiment, the server sends a copy of the message a directly to the recipient as an e-mail attachment In another exemplary embodiment, voice data is captured in real time by a transmission device such as the Nextel Direct Connect® cell phone. The voice data is transmitted as a voice message to a server system. The server system converts the voice message to a digital file, and time- and date-stamps the digital file. The digital file and associated information is then stored in a central database, and organized according to any user-specified organization scheme. One scheme could be a project log of files relating to observations about a project. Another scheme could be a billing and timekeeping system having comment and narrative files. Still yet another scheme includes one or more lists, such as to-do lists, punch lists, or patient records. The scheme could also include an organization of meeting minute files.

The digital file can then be accessed and delivered via the Internet. The contents of the digital file can also be e-mailed, electronically faxed, or played and transmitted over other voice or data networks. The server system automatically delivers a copy of the digital file to a recipient in several ways. The server system can send an e-mail notifying the recipient of the digital file with a link to a location from which the digital file may be accessed. Alternatively, the copy of the digital file can be attached to an e-mail sent to the recipient.

Figure 1:
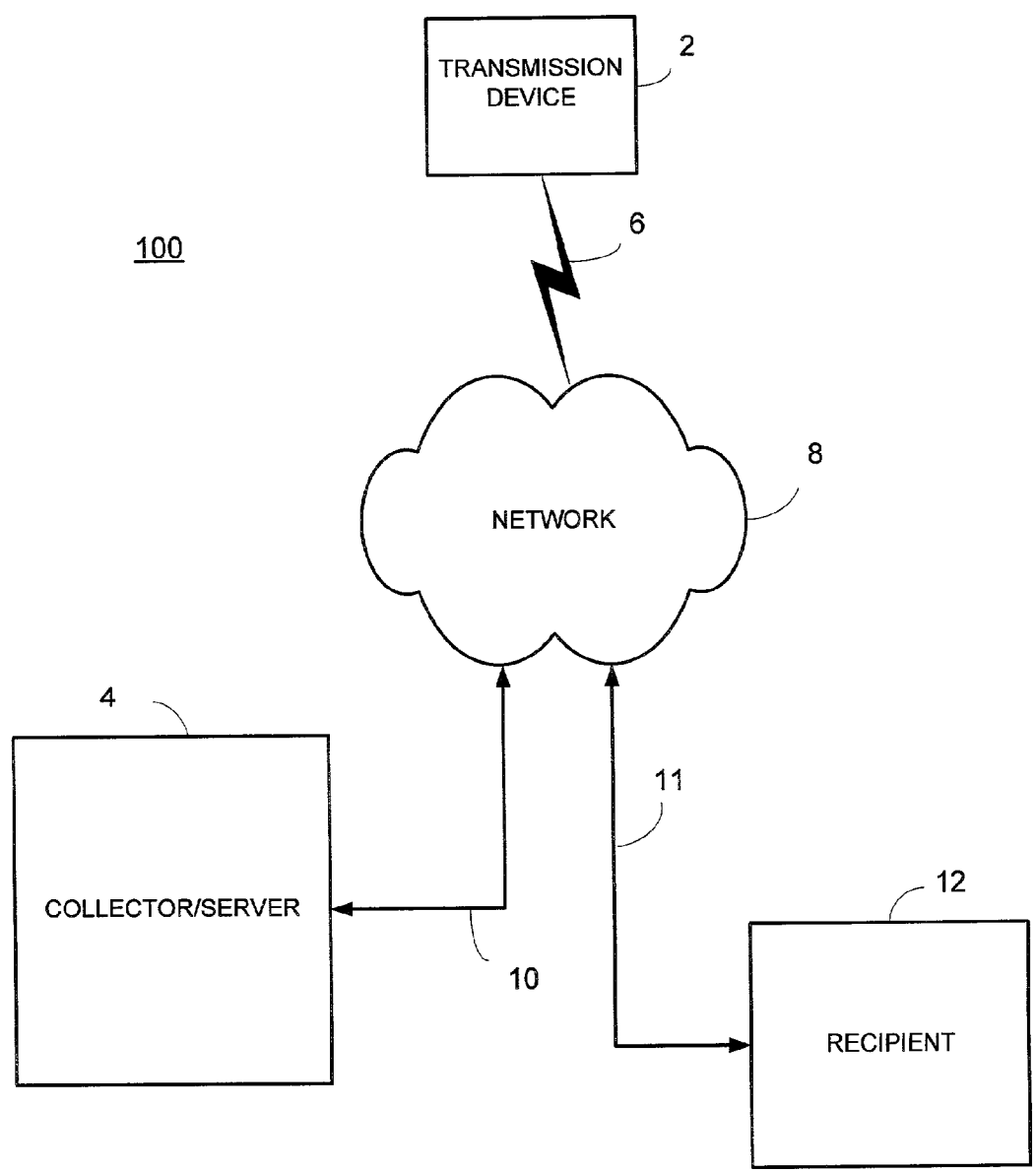
FIG. 1 is a simplified block diagram of a communication system according to an embodiment.

FIG. 1 is a simplified block diagram exemplifying a communication system 100 for originating, storing, managing, and delivering various forms of data. The communication system 100 includes at least one transmission device 2 communicating data with a collector/server 4 over a network 8 for subsequent access by a recipient 12. The recipient 12 can be a sender of the data, or one or more third parties identified by the sender. In one embodiment, the network 8 includes at least one wireless link 6, shown in FIG. 1 as between the transmission device 2 and the network 8, but which may also be between network 8 and the collector/server 4. According to the embodiment, the wireless link 6 can be a part of a cellular or wireless network operating according to any voice and/or data communication standard. The network can include any variety of transmission media including, without limitation, fiber optic cable, twisted-pair wire, and coaxial cable. In another embodiment, the transmission device 2 is connected to the network 8 by a wired link (not shown).

The transmission device 2 includes any type of device capable of transmitting data, which includes voice or other audio content, text or other symbols, images or other graphics, and video content, or any combination thereof. Data includes messages as well as metadata appended to or transmitted separately from messages. A message is a collection of data formatted to any one of a variety of message formats. Metadata includes identifiers (IDs), headers, addresses, footers, or other additional information related to the message or its transmission. In one embodiment, the transmission device 2 transmits messages formatted in the device's native protocol, such as the transmission control protocol (TCP) of the Internet protocol (IP) suite for Internet-enabled transmission devices.

Data is preferably transmitted as digital data, but can also be analog data converted to digital data at or before the collector/server 4. The transmission device 2 thus can be a telephone, personal digital assistant (PDA) or hybrid thereof, a computer (portable or desktop), one-way or two-way radio device, such as a pager, or any other known data transmission device. The transmission device 2 further may be integrated with other devices, such as a camera, camcorder, microphone, or voice recorder, for example. The transmission device 2 is preferably operated locally by a sender of the data, but it should be understood that the transmission device may be controlled remotely through a transmission device user interface. Although described as a device which sends data, the transmission device 102 may also receive data.

In one embodiment, the network 8 represents the Internet, to include any number of wired and wireless communication networks compliant with Internet-related protocols and standards. The network 8 may also represent a wide area network (WAN), local area network (LAN), or personal area network (PAN) connecting the transmission device 2 with the collector/server 4. The network 8 may even include a satellite communication network.

The collector/server 4 receives data, and maps metadata included with the data to one or more look-up tables to determine other information about the received data. The collector/server 4 then stores the data along with selected information related to the data. The collector/server 4 provides the recipient 12 access to the data based at least in part on reference to the selected related information stored with the data. The selected related information can include, in any combination, reference indicia such as the time, date, or duration of transmission or reception of the data, a project ID, an account identifier or identification (ID), intended recipient ID(s), sender ID and transmission device ID, data type, and storage entry ID, to name but a few examples. The collector/server 4 then serves a copy of the accessed data to the recipient via the network 8. The recipient 12 receives the copy of the accessed data using any device capable of communicating with the network 8 to receive the data, such as a computer, phone, PDA, etc.

Figure 2:
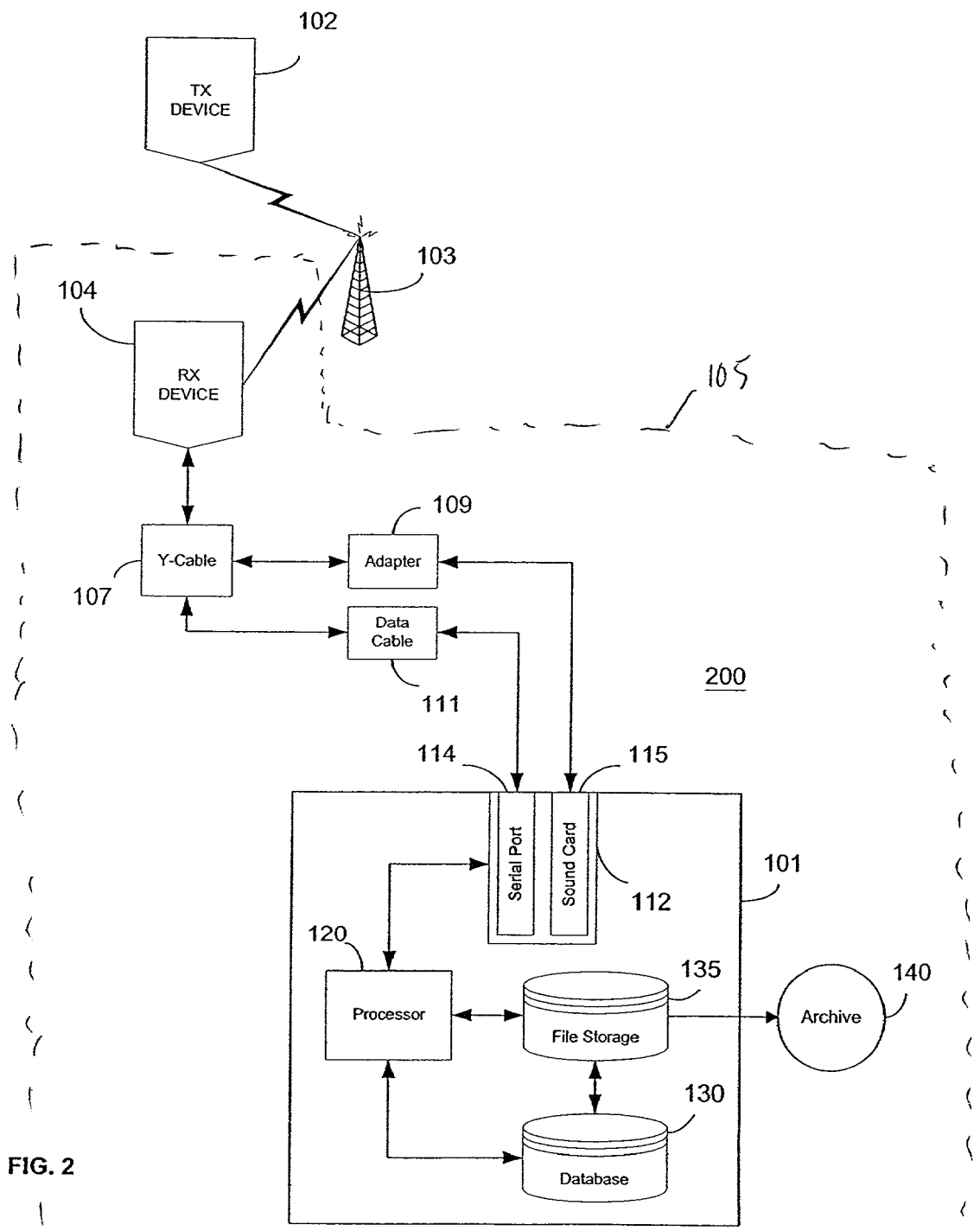
FIG. 2 shows a system for forming a project log, according to an embodiment.

FIG. 2 shows one specific embodiment of a communication system 200 according to the invention. In this embodiment, a transmission device 102 communicates with a collector/server 105 via a receive device 104 connected to a wireless network 103. The transmission device 102 can be a two-way cellular radio, such as a Direct Connect™ radio sold by Nextel Inc., or an IDEN™ phone sold by Motorola Inc. In the specific embodiment, the transmission device 102 uses the radio frequency spectrum to establish a direct radio link over the wireless network 103 to the receiving device 104, which can also be a two-way cellular radio.

The collector/server 105 includes a computer 101 that employs a communication interface 112. The communication interface 112 includes a serial port 114 and a sound card 115. The serial port 114 is connected to a data cable 111 to form a control channel for transmitting control signals and instructions between the receiving device 104 and the computer 101. The sound card 115 is connected to an adapter 109 to form a data channel, which is configured to receive data from the receiving device 104. A Y-cable 107 is used to connect the both the control and data channels to the receiving device 104.

The transmission device 102 transmits data to the receive device 104 of the collector/server 105, which receives the data and passes it to the computer 101 via the data communication interface 112, as described above. A processor 120 in the computer 101 processes the data and parses from it metadata, i.e. information related to the data, such as an intended recipient or group of recipients, priority of the data, or a file address to which the data is stored. The processor 120 also formats the received data as a digital file, which preferably has a format that can be compressed and stored. In a particular embodiment, the processor 120 is a central processing unit (CPU) of the computer 101. In an alternative embodiment, the processor 120 includes a digital signal processor (DSP). The processor 120 may also be a distributed processing platform, distributed among two or more computers 101.

The data is stored in a storage 135. The metadata is also stored as tables in one or more records in a database 130. Data may also be archived in an archive 140 for long-term storage and retrieval of the digital files and/or associated database records. Those having skill in the art would recognize that functions of the storage 135, database 130, and archive 140 may be performed either by a single storage system or a distributed storage system. Such as storage system can include any type or number of storage media. The data stored in the storage 135 may be accessed via a network such as electronic mail and/or the Internet (not shown). In a particular embodiment, the storage 135 contents are persistent, secure, and copy-protected, so as to ensure their validity. Accordingly, once stored, the data is difficult or impossible to manipulate or otherwise change by a third party, who may or may not have access to a copy of the data.

Figure 3:
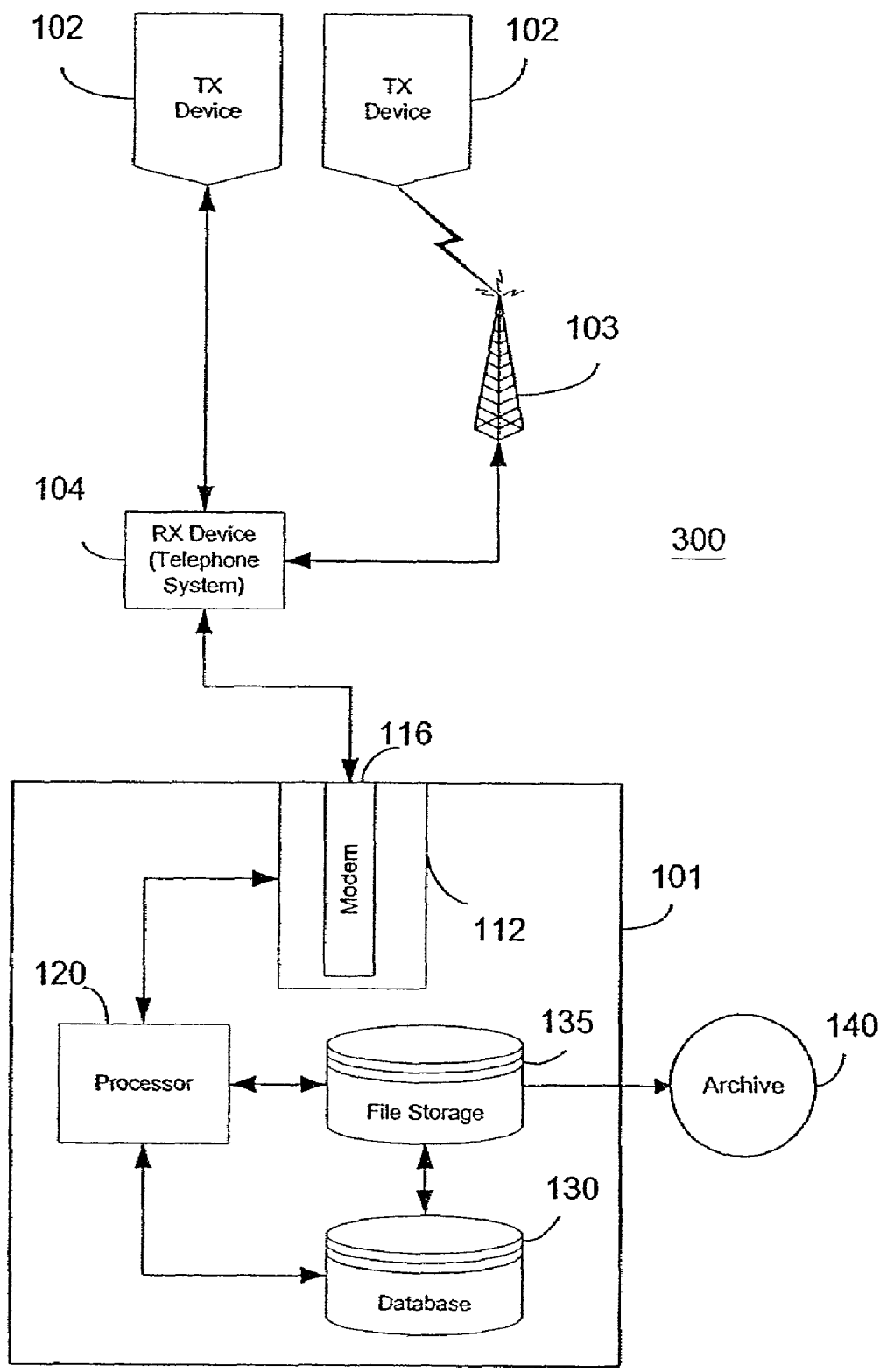
FIG. 3 illustrates another embodiment of a system for forming a project log.

FIG. 3 illustrates a communication system 300 for originating and collecting data according to an alternative embodiment of the invention. In the communication system 300, the data communication interface 112 to the computer 101 includes a modem 116 configured to communicate with a telephone system used as the receiving device 104. The telephone system can be a conventional plain-old telephone system (POTS) through which telephone signals are communicated via standard twisted-pair wire cable. In this embodiment, the transmitting device 102 can be either a wired telephone communicating over the POTS network, or a wireless telephone communicating with the POTS network through a wireless network 103.

Figure 4:
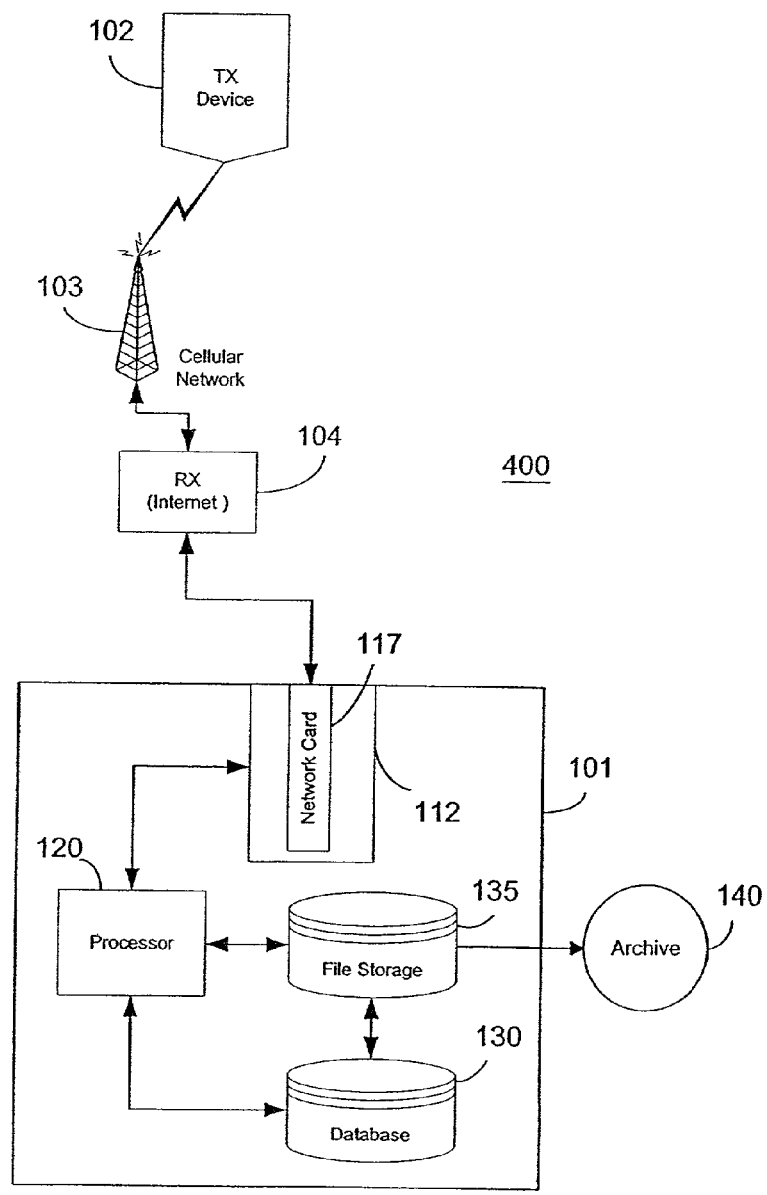
FIG. 4 shows yet another alternative embodiment of a system for forming a project log.

FIG. 4 shows yet another alternative embodiment of a communication system 400, which includes a computer 101 having a data communication interface 112 as substantially described above. The data communication interface 112 includes a network card 117 configured for communication with a data network, such as the Internet, a portion or node of which is used as the receiving device 104. The transmission device 102 communicates data as a form of Internet Protocol-compliant messages to the receiving device via cellular network 103.

Figure 5:
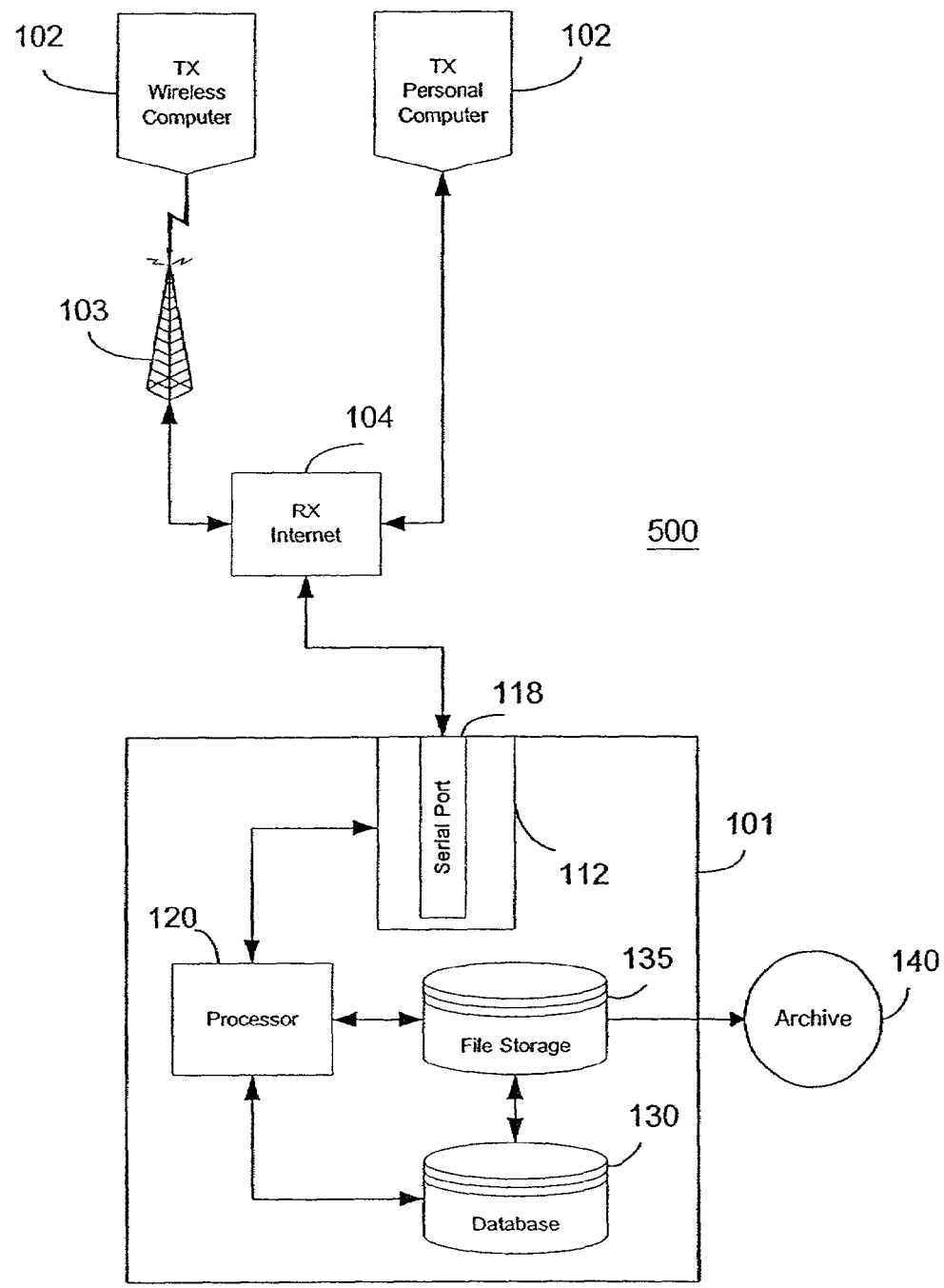
FIG. 5 shows yet another alternative embodiment of a system for forming a project log.

FIG. 5 shows yet another communication system 500 for originating and collecting data. The communication system 500 employs a data communication interface 112, which includes a network card 118 for communication with the network. At least a portion of the network acts as the receiving device 104. Suitable transmission devices 102 for the embodiment shown in the system 500 include a personal computer (PC), a wireless computer, such as a portable PC having wireless capabilities or a handheld personal digital assistant (PDA), connected to the receiving device 104 via a cellular network 103.

Figure 6:
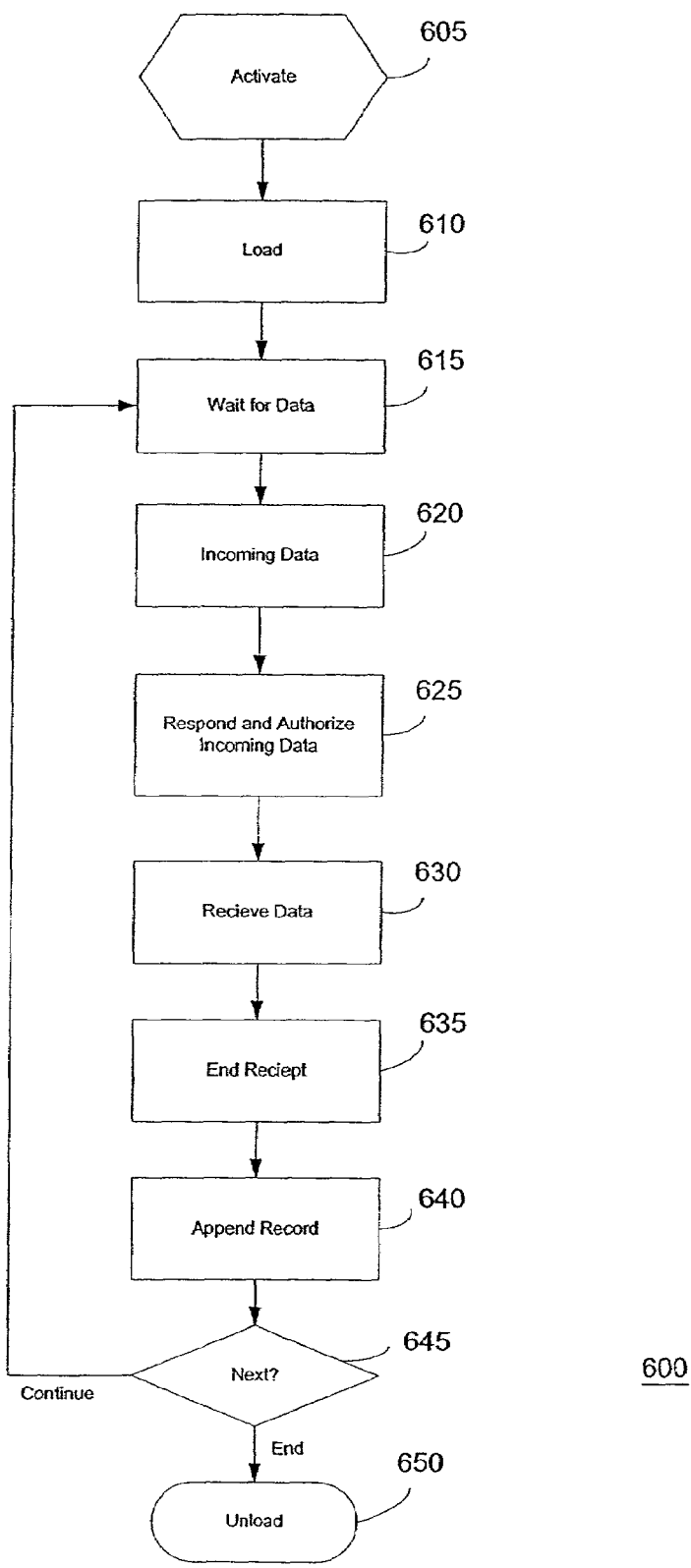
FIG. 6 illustrates one method of forming a project log according to the invention.

FIG. 6 illustrates one method 600 of originating, storing and delivering data. Method 600 begins at process block 605, in which global variables are initialized within software commands the processor and controls the forming of a project log. The process block 605 thus activates a process for receiving data. According to one method of the invention, at process block 610 a plurality of multimedia control objects (MMControl) are loaded, which set up a computer for communication with the transmission device through the receive device. Process block 610 is used to initialize an audio or video recording device through MMControl. In one specific embodiment, at process block 610 a bank of cellular telephones, having a two-way radio capability and acting as transmission and/or receive devices, are initialized and connected to enable direct messaging to the computer.

At process block 615 in the method 600, a wait period is executed to wait for data being transmitted and received. At process block 620, an authorization request is received as incoming data. In an embodiment, the authorization request includes a member identification number from one member of a group of mobile phone users. The identification number is looked up in a table that is part of a database of numbers. If the user is authorized to access the project log, then an authorization is given at process block 625. The identification number, along with the date and time of receipt of the authorization, is used to create a new record, including a filename, for the newly created record. In one embodiment, the filename will be appended to the data, and stored as a reference indication in the database.

Upon authorization, the communication link from the computer 101 to the relevant transmitting device 102 is in a state for carrying data. At process block 630, data representing an observation is received. As stated above, the data may be in any form, including digital or analog format. Examples of suitable analog data includes voice signals from a two-way radio, cellular phone, or conventional telephone. Digital data includes digital signals sent from a digital phone or a computer. According to one specific example, an observer speaks into a cellular radio that acts as a transmission device. The voice signals are transmitted to a second cellular radio that acts as a receive device.

The data is received until process block 635, when the transmission of data is stopped, and the receipt of data is accomplished. At block 635, the step of processing the received data is accomplished. For example, the voice signals from the receive device are received as an audio stream by a computer and processed into a sound clip, or other digital file. At block 635, all properties of the system are set in order to stop receiving and recording incoming data. The received data is set for being appended with metadata, and a duration of time in which the data was received is calculated.

At process block 640, various database routines are called to open the authorized database records and insert the data in a new or existing record. Metadata is also inserted. The record is then appended with reference indicia, which may include, but is not limited to, duration, sender identification, date, time, and filename. At step 645, a decision is made whether to execute an instruction to continue the process, or to end the method. If the process continues, the method returns to process block 615 to wait for more data. If no more data is to be received, an unload step is executed at process block 650 to deactivate incoming communication links and switch all communication devices to an inactive state.

Figure 7:
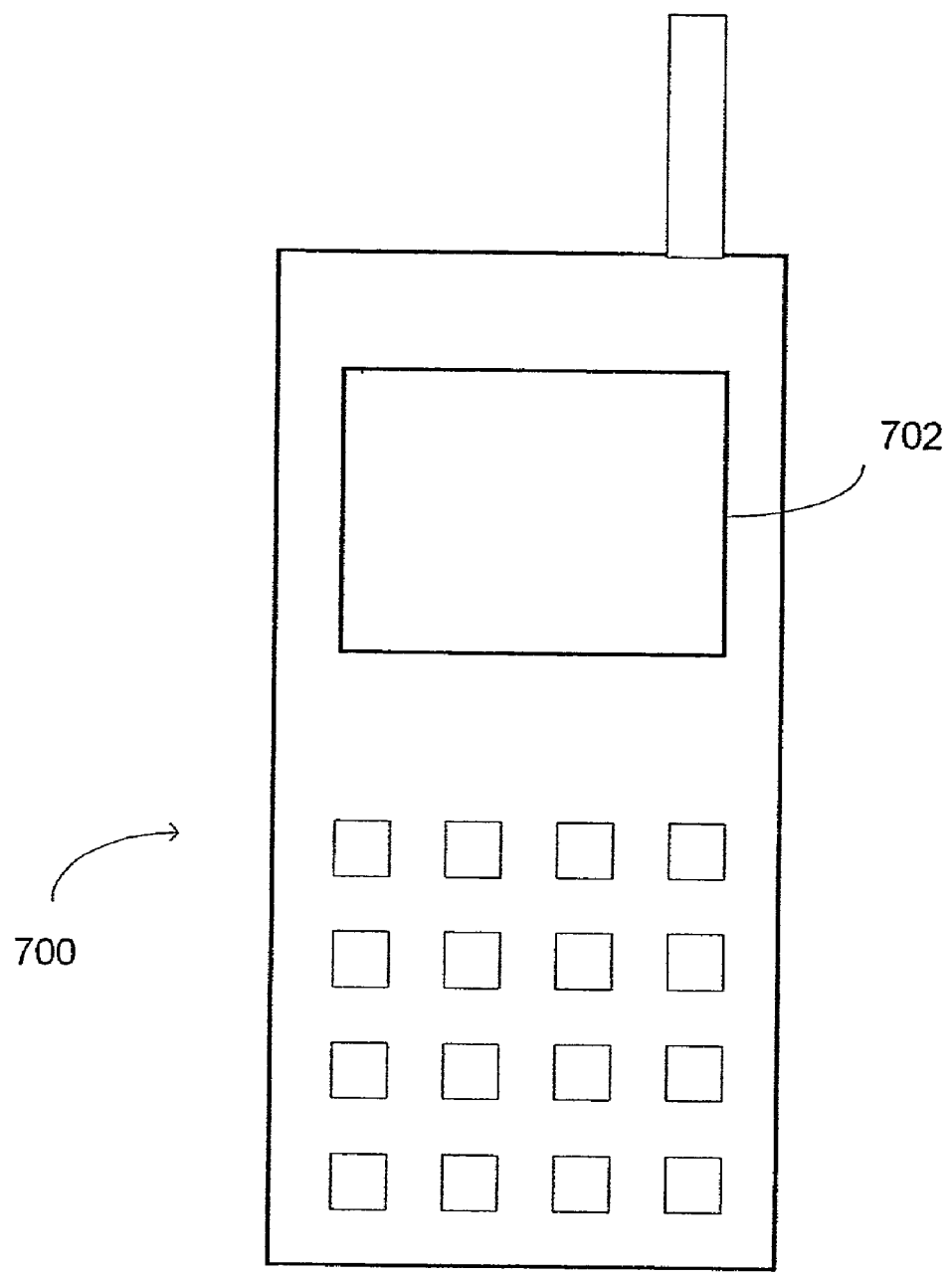
FIG. 7 shows one example of a transmission and/or receive device according to an embodiment of the invention.

Referring back to the general system shown in FIG. 1, and with reference to FIG. 7, there is shown a specific device 700 suitable for use as either a transmission device 2 or receive device 4. In one embodiment, the device 700 is a two-way hand-held communications device that operates in the short-wave frequency band, such as a walkie-talkie. Although the distance between a transmission device 2 and receive device 4 is limited with a walkie-talkie short-wave radio device, such devices 700 can be employed in scenarios where interference and power consumption are considerations. For instance, such a device 700 is suitable for in-room hospital use, where cell phone use is disallowed.

The device 700 may further include a memory for storing a call-list and a screen 702 for displaying the call list. A user can select a number of the sender, a number for the recipient, and a project identification number, all of which can be useful to map a certain transmission with a project. The memory can also be used to store a log of outgoing transmissions or incoming receptions, depending on whether the device 700 is used as a transmitter or a receiver. Accordingly, the device 700 can communicate data from a sensitive geographical area, such as within a hospital room, to another geographical area in which a storage resides.

The device 700 may further include logic for scanning the available frequencies for a channel over which data may most effectively be transmitted. In a specific embodiment, the device 700 also includes logic and a processor for encrypting signals being transmitted or decrypting signals being received. For selected signals being transmitted, the device 700 automatically inserts metadata into the transmission stream. The metadata includes reference indicia which identifies the date and time the transmission is executed and/or the signals are received.

Those skilled in the art would recognize that each embodiment of the communication system discussed above may be combined with other like embodiments or different embodiments. For example, the systems shown in FIGS. 1–4 may be implemented with a bank of parallel data communication interfaces 112 configured for connection to a plurality of transmission devices 102.

In another embodiment, a transmission device used by an observer of an event includes a memory for caching data representing the observation. The data is cached until a suitable connection is made available to a receiving device or directly to the computer system. The caching can include appending with reference indicia for storage in the local memory of the transmission device, or logic that appends the reference indicia when the cache is emptied and the data is transmitted to its ultimate destination for inclusion in the project log.

Figure 8:
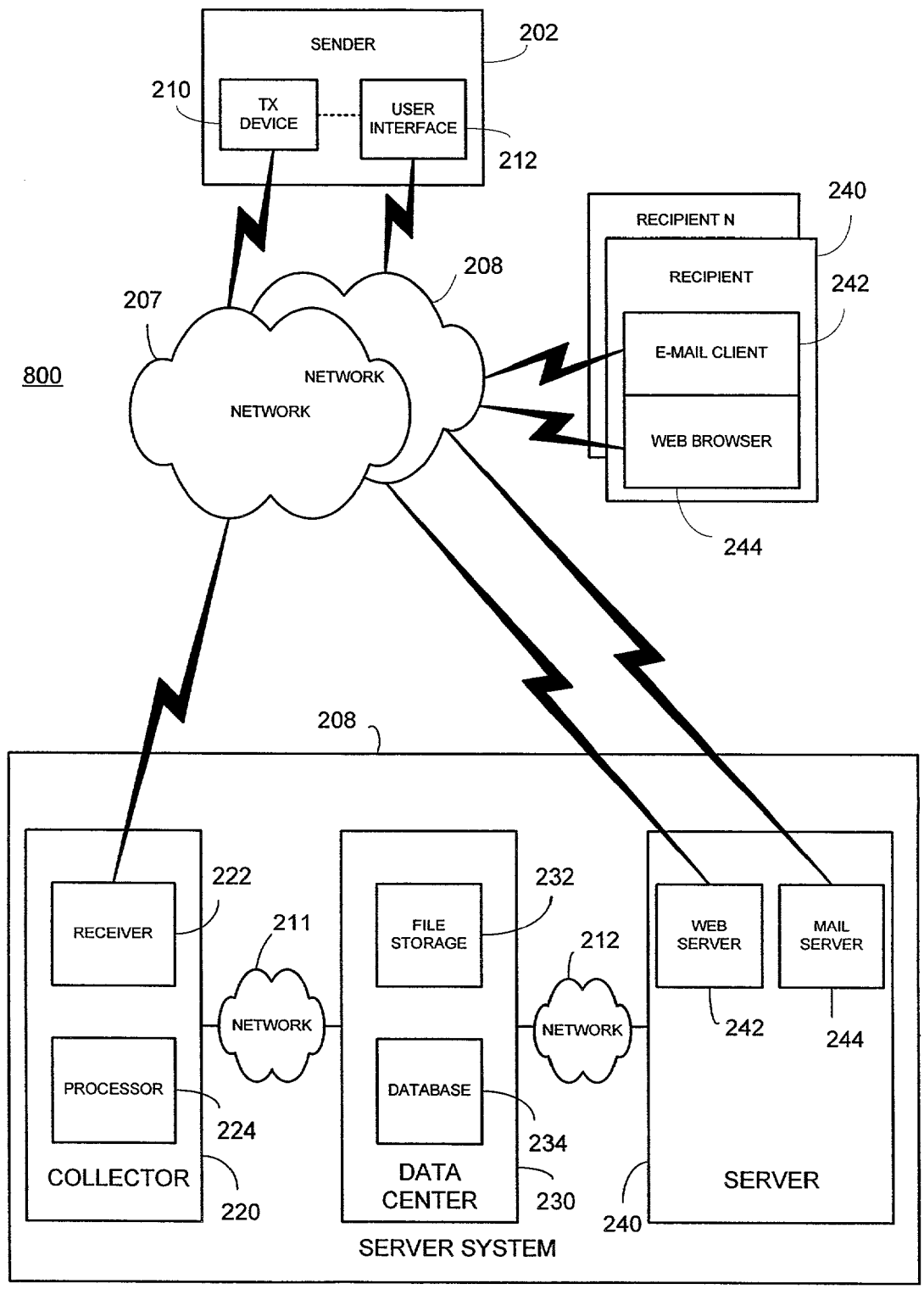
FIG. 8 shows a communication system according to another embodiment of the invention.

Referring now to FIG. 8, a communication system 200 is shown according to another embodiment of the invention. The system 200 includes a sender 202, a transmission device 210, a server system 208, and a recipient 240.

The sender 202 represents any person or entity that communicates a message—intended for a message recipient—to the transmission device 210. The sender's message is communicated to the transmission device 210 in one or more of many ways using a transmit action. The transmit action can include a single transmit action, such as pressing a button and speaking (i.e. "press-to-talk"), taking a photo or video, or touching a pad with a stylus. The transmit action also includes entering text, selecting choices from menus, etc. The message recipient can be a person, group of persons, a storage location on the server system, or both a storage location and a person or persons.

The transmission device 210 transmits the sender's 202 message via a communications network 207 to a particular, unique address of a file storage 232, which is one of a plurality of unique addresses associated with the server system 208. The communication network 207 may include at least one wireless link. The message is transmitted along with metadata, including at least a unique ID of the transmission device 210. Additional metadata sent with the message can include data representing the length, urgency, time of transmission, etc. of the original message. The unique addresses associated with the server system 208 need not be directly associated with an address or identity of any intended recipient 240, except by reference to related metadata stored in a database 234 in the server system 208.

The transmission device 210 can be a standard telephone, cell phone, Nextel phone with iDEN capability, radio or satellite phone, or wireless PDA or programmable phone device running special software, or other communication device. The unique address can be a POTS phone number, an iDEN private ID number, an IP address, a Uniform Resource Locator (URL) address, or other unique address that can be sent by the transmission device 210 and recognized by the server system 208.

In one embodiment, the server system 208 includes a collector 220, a data center 230, and a server 240. The collector 220 has one or more receivers 222, each of which has a unique address that is addressable by the transmission device 210. The receiver 222 receives the message and associated metadata, preferably in the format native to the particular type of transmission device 210 used. The collector 220 also includes a processor 224 which reformats the received message and associated metadata into a format meaningful to the memory structures in data center 230, which include the file storage 232 and the database 234, and routes the message metadata to the data center 230 over data center network 211. The data center network 211 can include a WAN, LAN, PAN, bus, or any other connection media or communications platform.

The database 234 accepts the message metadata from the collector 220 and parses the received data into its components, including the content of the sender's message, and the unique transmission device identifier.

The server system 208 also includes the server 240, which has a web server 242 and a mail server 244. While functionally distinct, the web server 242 and mail server 244 may be a single server. Further, each server may be embodied as a servlet program resident on a host server platform. The server 240 is connected with the data center via server network 212, which like the data center network 211 can also include a WAN, LAN, PAN, bus or any other communications platform. Thus, the server 240 can include a farm of servers distributed among separate server devices or spread geographically via connections to the server network 212.

The server 240 receives requests from either the recipient 240 or the sender 202, and responds to requests either through the web server 242 or mail server 244. The mail server 244 transmits electronic notifications, via e-mail, to a requester or recipient of a message. The notification can include a hypertext link to the web server 242. The web server 242 receives a copy of a requested message from the data center 230, and serves up the copy in a web page to the requester or the recipient. The web page can be formatted according to a markup language, such as extensible markup language (XML) or hypertext markup language (HTML), and downloaded through the second communications network 208 via any transport technique to a browser or other rendering program.

The sender 202 also includes a user interface 212 for accessing and retrieving data from the server 240 of the server system 208 via the second communications network 208. The communications networks 207 and 208 may be one in the same, or completely different networks. The user interface 212 can be a computer, a phone, a PDA, or any other device capable of receiving data. In one embodiment, the user interface 212 includes a computer and a display, and the requested information is displayed as an HTML or XML page in a web browser program rendered on the display. Although represented in FIG. 8 as part of one sender block 202, it should be understood that the transmission device 210 and user interface 212 may be the same device, different devices, or even remotely positioned and/or operated by different persons.

The recipient 240 is a person or entity to which a sender's message is ultimately intended. FIG. 8 shows more than one recipient 240, but it should be understood that there can be any number of recipients 240. The recipient 240 includes an e-mail client 242 for receiving the notifications from the mail server 244, and a web browser 244, or other similar program, for receiving and rendering the messages from the web server 242. Messages may also be received from the mail server 244.

Figure 9:
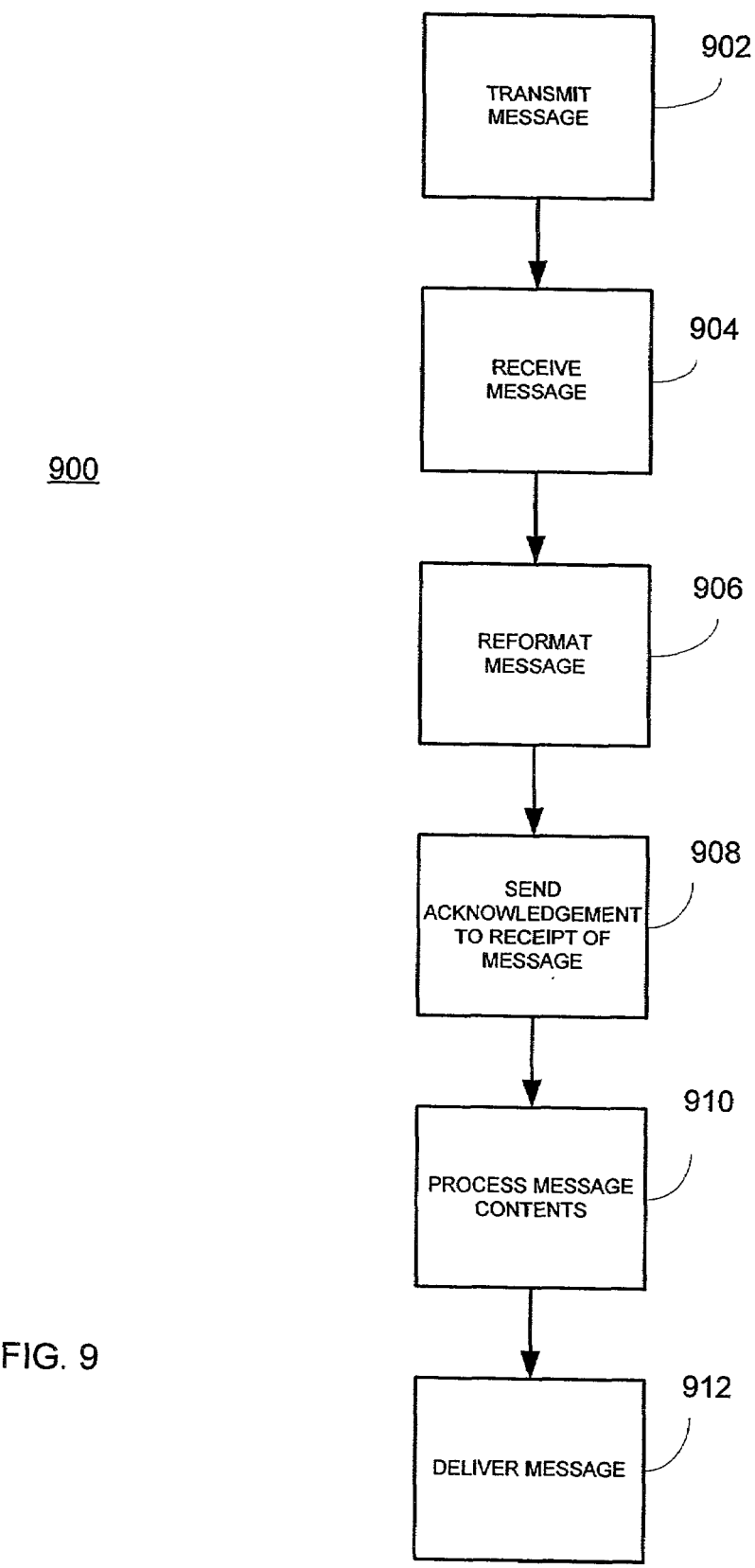
FIG. 9 is a flowchart of a method of originating, storing, processing and delivering message data.

FIG. 9 is a flowchart of a method 900 of originating, processing, storing, and delivering data according to an embodiment. A message is transmitted from a transmission device (block 902), and received by a receive device (block 904). The transmission device has a unique identifier, while the receive device is associated with an address to which the message is transmitted. The message is transmitted in a format native to the transmission device, and reformatted to a proprietary or standard format compatible with a database within the server system (block 906). The reformatted message includes at least the original message, the unique identifier of the transmission device, and the unique identifier of the address associated with the server system to which the message was addressed.

The reformatted message may be formatted in accordance with a markup language.

When the message is received, an acknowledgement (ACK) signal is sent back to the transmission device (block 908). The ACK signal can be a signal which causes the transmission device to emit an audible signal, or a signal which causes the transmission device to display a visual signal. At block 910, the received message and related metadata is processed for storage, after which the message contents and related metadata may be accessed and delivered to a recipient (block 912).

Figure 10:
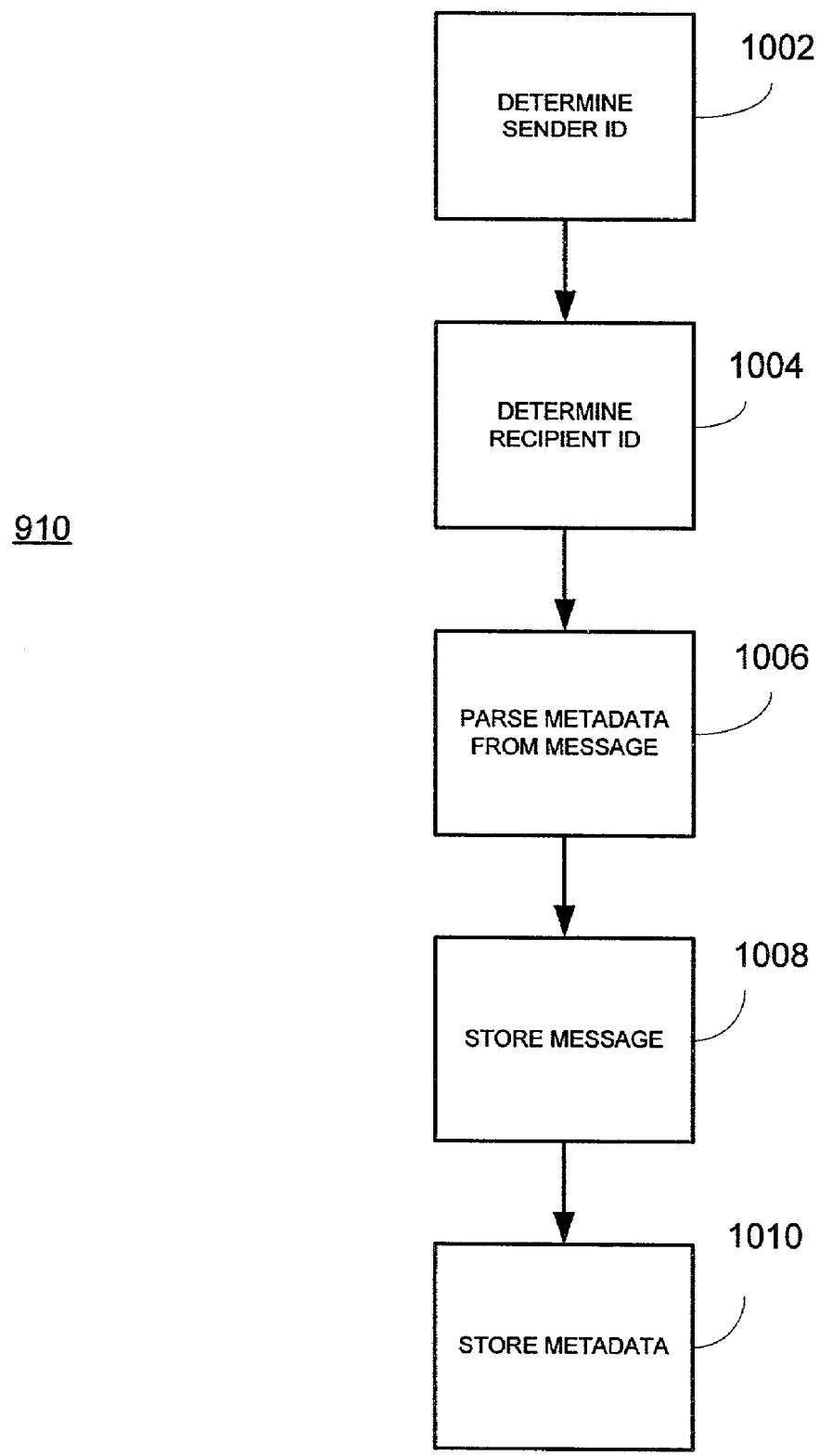
FIG. 10 is a flowchart of an expanded method of storing and processing message data.

FIG. 10 illustrates a method 910 of processing and storing a message according to an embodiment. The sender's identity is determined (block 1002) by reference to information previously stored in the database, where each unique transmission device identifier is associated with a unique sender identifier. Alternatively, the transmission device identifier serves as a proxy for the sender identifier. The recipient's address of the ultimate recipient is also determined (block 1004) by reference to information previously stored in the database, in which a unique combination of the sender (or transmission device) identifier and the receive address associated with the server system is associated with a unique recipient identifier of the ultimate recipient, and by reference to a network address of the ultimate recipient.

The message is parsed into its components, including content of the message and related metadata (block 1006). A file having the contents of the original message is stored in a storage associated with the server system (block 1008). Appropriate entries are made to a record in the database (block 1010) to enable the stored message to be located, retrieved and presented to authorized recipients upon request.

Figure 11:
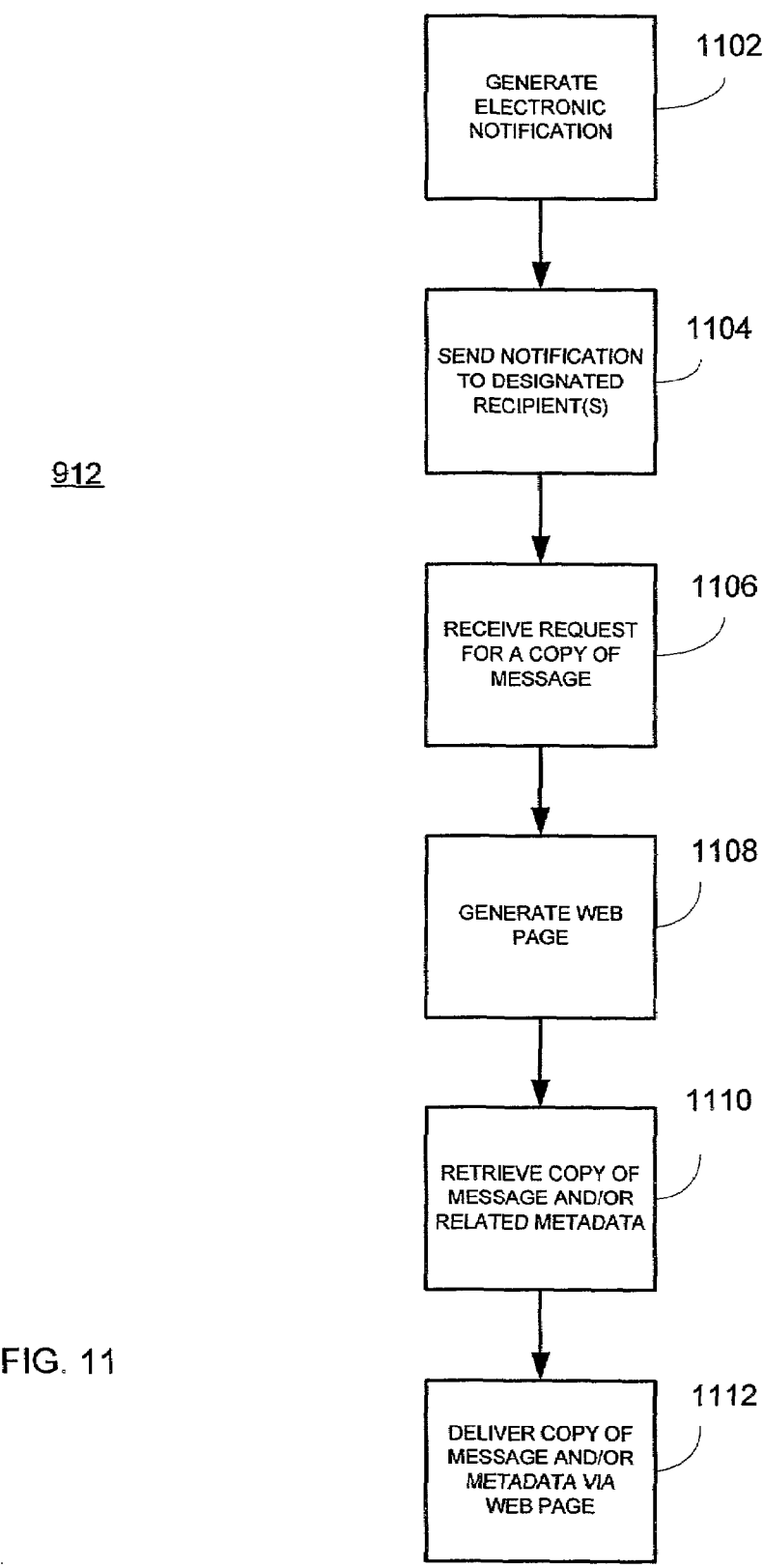
FIG. 11 is a flowchart of an expanded method of delivering message data to an intended recipient.

FIG. 11 illustrates a method 912 of delivering a message according to an embodiment. Once the message is received at the server system, an electronic notification is generated (block 1102) and sent to one or more designated and/or authorized recipients (block 1104). The notification is sent to a network address associated with each recipient. One type of notification includes an e-mail message delivered by an e-mail server. The e-mail message can include a link to the original message stored in the server system, or include a copy of the original message as an attachment. Another type of notification can be a voice or text message delivered to a phone or other communication device of the recipient.

When a link is employed, the link can include a hyperlink to allow access to the original message stored at the server system. In response to user selection of the link, a web page is generated (block 1108) and a copy of the original message is retrieved from storage (block 1110). The link can include embedded information allowing only the actual intended recipient of the link to access an active server page that would serve up the specific message to the browser on the computing device from which the link was activated. The embedded information can have a time stamp designating a certain time interval after which authorization to access the message expires. The embedded information can be included in a query string appended to a (URL) which identifies the location in the server system of the message to be accessed. The embedded information can also be encrypted.

Figure 12:
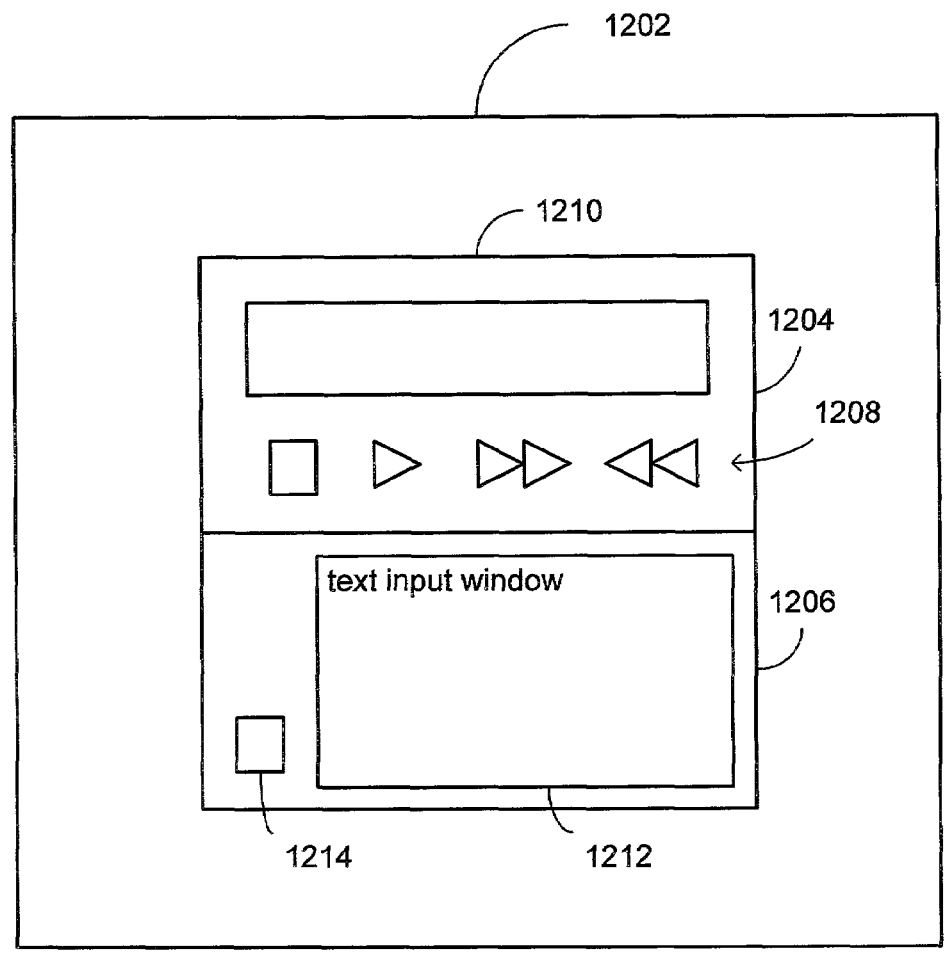
FIG. 12 is a display including an integrated media player and text input window.

A copy of the accessed message is delivered from the server system to an address associated with the recipient (block 1112). In one embodiment, the message is transmitted in a web page. FIG. 12 shows one embodiment of a web page 1202. The web page can be an active server page. The web page can include a media player 1204 to render the message to the recipient in whichever media format the original message exists. The media player 1204 can be locally stored on the recipient's computing device, or downloaded along with the message and used with the recipient's web browser. In one example, the original message is an audio file, and the media player plays a digital copy of the audio for the recipient to hear. The media player 1204 includes a graphical display 1210 for displaying status information or a rendering of the message, and a variety of user controls 1208 with which a user can control the playing of a message.

The web page can also include metadata associated with the message. The metadata includes time stamp information, and can include the time each message was accessed by each recipient, or which recipients have received and accessed messages. The metadata can be displayed in the media player graphical display 1210, or in a separate window. The metadata can also include additional information, such as a text transcription of the original message, the origination of which is described in greater detail below. According to one particular embodiment, the web page is accessible only to the sender of a message, enabling the sender to access previously transmitted messages and additional information associated with the messages.

The web page may also include a text input window 1206, which can be displayed separately from or combined with the media player 1204. The text input window includes a text box 1212 for receiving text from a user input device such as a keyboard, keypad, touchpad, or voice input device used with a voice-to-text conversion program. Other user input devices can also be used. The text includes a transcription of the message, a reply associated with the message or the sender, or a comment.

The text input window 1206 further includes a transmit control 1214, such as a graphical tab or button for example, which can be used for transmitting the text to one or more addresses. In one embodiment, the text is transmitted back to the server system for storage with the message. In the embodiment, the text is tagged with pointers to the message so that the text is accessible when the message is accessed. Alternatively, the text is appended to the message and stored in the same memory.

In another embodiment, the text is sent to the sender, with or without being stored at the server system. The message or its notification to the recipient can include an address for the sender, such as the sender's transmission device or other terminal device able to receive and render the text. The text input window transmit control 1214 causes a program to reformat the text to a transmission format which is compatible for each text recipient.

Figure 13:
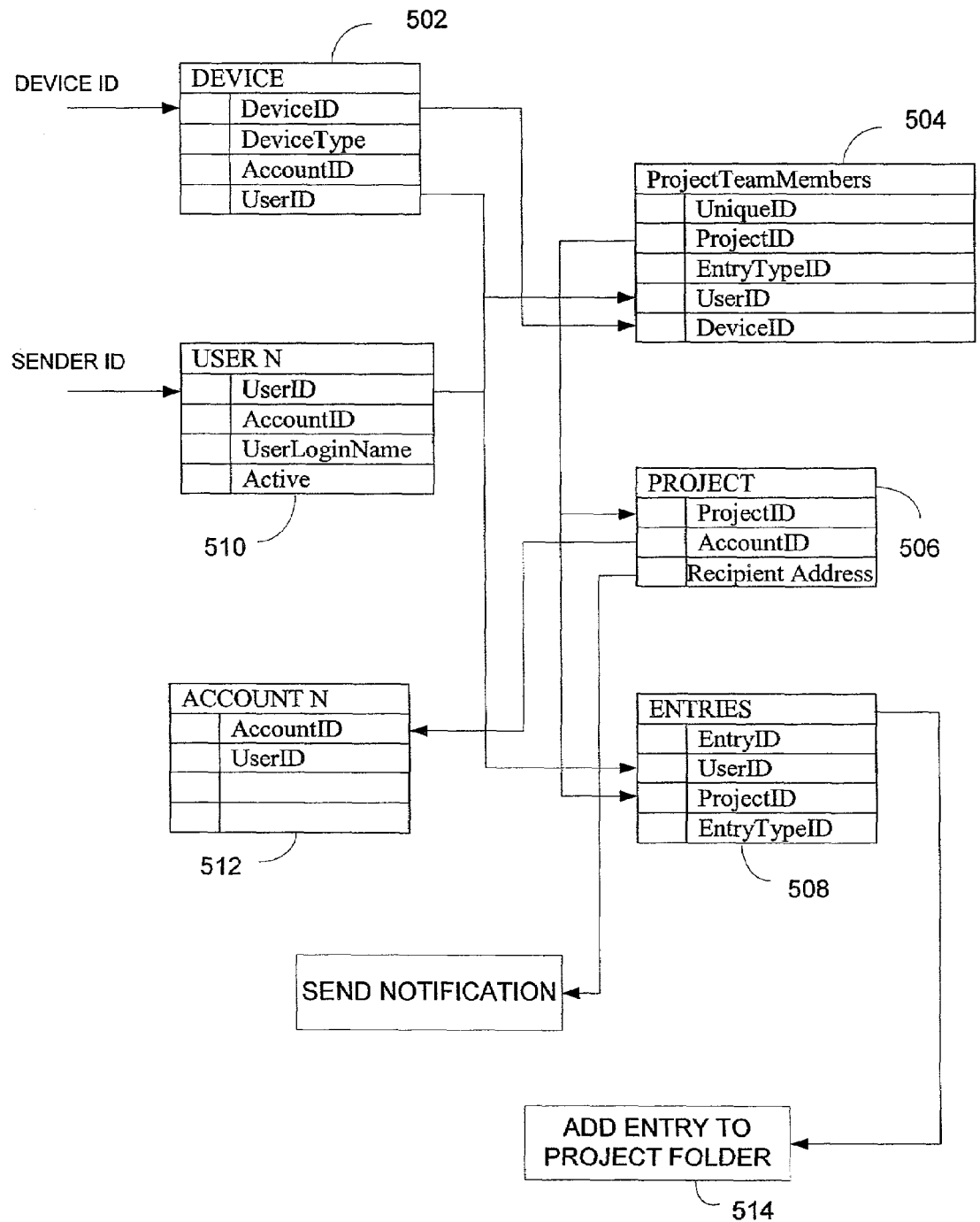
FIG. 13 illustrates a display and user interface including a media player and text input window according to an embodiment.

FIG. 13 illustrates a series of look-up tables for automatic processing of messages. As described above, a system according to an embodiment can determine additional information about a message based on several parameters included with metadata received with the message. In an example shown in FIG. 13, a device ID and a sender ID are received along with a message. The device ID is preferably an identifier of a receiver connected with the server system, but can also be an interface address associated with the collector of the server system, or any other interface to the transmission device which sent the message. The sender ID is preferably either the unique device identifier of the transmission device, or an identifier associated with the sender or user of the device.

The device ID and sender ID are provided to look-up tables, represented by a DEVICE table 502 and a USER table 510, respectively, to resolve additional other information related to the message. The device ID is combined with the sender ID (i.e. "UserID") in another table, represented as a ProjectTeamMembers table 504, to determine a project identifier (ProjectID) of a project associated with the sender and the message. The project identifier can then be used to access a PROJECT table 506 which can include, for example, an address of an intended recipient to which a notification is to be sent. The project identifier can also be used to determine which entry should be accessed (EntryID from the ENTRIES folder 508) for storing the message and/or metadata as an entry in the database. An ACCOUNT folder 512 may also be accessed with reference to an AccountID determined from the PROJECT folder 506.

While the tables in FIG. 13 show one embodiment of using look-up tables for compound indexing to automatically process messages and metadata, it should be understood that these tables are exemplary only. The tables, table names, and table content can take any form. Further, more or less tables than those which have been described can be used. The tables provide scalability of a system to accommodate any number of users, including senders and recipients, without having to significantly alter the system architecture or method of operation thereof.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of originating and delivering a message, comprising:
   under the control of a transmission device:
      selecting an address identifier associated with a server system, and
      in response to a single transmit action, transmitting a message intended for an intended recipient, along with a sender identifier related to a transmission device, to the saver system using the address identifier; and
   under control of the server system:
      receiving the message, and
      determining a recipient identifier of the intended recipient based on a combination of the address identifier and sender identifier.

2. The method of claim 1, further comprising displaying information identifying the at least one intended recipient.

3. The method of claim 1, further comprising determining a transmission device identifier based on the sender identifier.

4. The method of claim 3, further comprising determining a project file identifier based on the combination of the address identifier and the transmission device identifier.

5. The method of claim 1, further comprising retrieving previously stored additional information for the intended recipient based on the recipient identifier.

6. The method of claim 5, wherein the additional information includes an e-mail address of the intended recipient.

7. The method of claim 1, further comprising relaying the message to the intended recipient based on the recipient identifier.

8. The method of claim 6, further comprising relaying the message to the intended recipient based on the e-mail address.

9. The method of claim 8, further comprising sending a mail message to the e-mail address of the intended recipient, wherein the mail message includes a reference to the message being relayed.

10. The method of claim 7, wherein relaying the message includes serving the message to a player program in a web browser associated with the intended recipient.

11. A method of storing, processing and delivering message data, comprising:
   receiving a message from a transmission device at a receiver address having a receiver identifier; and
   determining a recipient identifier of an intended recipient of the message based on a combination of the receiver identifier and an identifier associated with a sender of the message received along with the message.

12. The method of claim 11, wherein the identifier associated with a sender of the message includes a device identifier of the transmission device.

13. The method of claim 11, wherein the identifier associated with a sender of the message includes a user identifier of the sender.

14. The method of claim 11, further comprising storing the message based on the recipient identifier.

15. A method of originating and storing a message from a transmission device, comprising:
    selecting an identified recipient; and
    in response to a transmit action by a sender, transmitting a message intended for the identified recipient, along with a sender identifier associated with the transmission device, over a network to a storage address connected wit the network via a receiver, wherein the storage address is selected based on a mapping of the sender identifier with a receiver identifier associated with the receiver.

16. A method of receiving and storing a message from a transmission device, comprising:
    receiving, on a receiver, a message for an intended recipient over a network, along with a sender identifier associated with the transmission device;
    mapping the sender identifier with a receiver identifier associated with the receiver to determine a storage address for the message.

17. The method of claim 16, further comprising storing the message in a storage corresponding to the storage address.

18. The method of claim 17, further comprising generating a notification for being sent to the intended recipient.

19. The method of claim 18, further comprising determining a recipient address associated with the intended recipient based on the mapping of the sender identifier with the receiver identifier.

20. The method of claim 17, further comprising storing the sender identifier and receiver identifier in a database as metadata related to the message.

21. A method of originating, storing, processing and delivering a mess age, comprising:
    under control of a transmission device;
    selecting an identified recipient; and
    in response to a transmit action by a sender, transmitting a message intended for the identified recipient, along with a sender identifier associated with the transmission device, over a network to a storage address at a server system connected wit the network via a receiver, wherein the storage address is selected based on a mapping of the sender identifier with a receiver identifier associated with the receiver;
    under control of the server system;
    receiving, on a receiver, a message for an intended recipient over a network, along with a sender identifier associated with the transmission device;
    mapping the sender identifier with a receiver identifier associated with the receiver to determine a storage address for the message.

22. A method of delivering a message over a network, comprising:
    determining a recipient address of an intended recipient based on a mapping of a sender identifier of a sender which originated the message and a receiver identifier of a sewer system address at which the message was received; and
    generating an electronic notification for being sent to the intended recipient at the recipient address.

23. The method of claim 22, further comprising sending the electronic notification to the recipient address via e-mail.

24. The method of claim 22, further comprising, after the electronic notification is sent to the recipient address, transmitting a copy of the message over the network to the intended recipient.

25. A system for originating, storing, processing and delivering messages, comprising:
    a transmission device comprising a single transmit action input and configured to:
        select a receive device identifier;
        receive a spoken message,
        generate a message comprising the spoken message and a transmission device identifier,
        receive a single transmit action via the single transmit action input, and
        transmit the generated message to a receive device associated with the selected receive device identifier over a first network in response to the received single transmit action;
    a server system comprising a plurality of receive devices, each of the plurality of receive devices being associated with a receive device identifier, the server system configured to;
        receive the message transmitted by the transmission device via one of the plurality of receive devices, the receive device being associated with the receive device identifier selected by the transmission device,
        identify a recipient based on the combination of the transmission device identifier and the selected receive device identifier, and
        send an email to the identified recipient over a second network containing the spoken message included in the received message; and
    a recipient platform connected to the server system via the second network, the recipient platform configured to receive the email and allow the spoken message to be played for the recipient.

26. The system of claim 25, wherein the first network includes a wireless link.

27. The system of claim 25, wherein the server system includes a collector, a data center, and a server.

28. The system of claim 27, wherein the collector includes the plurality of receivers configured to receive messages from the transmission device.

29. The system of claim 28, wherein the collector further includes a processor connected to the plurality of receivers for processing the messages.

30. The system of claim 27, wherein the data center includes a storage for storing the messages.

31. The system of claim 30, wherein the data center further includes a database for storing metadata related to the messages.

32. The system of claim 27, wherein the server includes a mail server for transmitting emails over the second network.

33. The system of claim 27, wherein the server includes a web server for retrieving a copy of a message, and transmitting the copy to the recipient platform in a web page.

* * * * *

UNITED STATES PATENT AND TRADEMARK OFFICE
CERTIFICATE OF CORRECTION

| | | |
|---|---|---|
| PATENT NO. | : 7,054,863 B2 | Page 1 of 1 |
| APPLICATION NO. | : 10/174655 | |
| DATED | : May 30, 2006 | |
| INVENTOR(S) | : Lasensky et al. | |

It is certified that error appears in the above-identified patent and that said Letters Patent is hereby corrected as shown below:

Column 13, Line 56, delete the word "sewer" and insert in lieu thereof the word
-- server --

Signed and Sealed this

Fifth Day of September, 2006

JON W. DUDAS
*Director of the United States Patent and Trademark Office*